(12) United States Patent
Sharpe et al.

(10) Patent No.: US 12,737,682 B2
(45) **Date of Patent: *Sep. 15, 2026**

(54) UNCERTAINTY ESTIMATION USING UNINFORMATIVE FEATURES

(71) Applicant: Capital One Services, LLC, McLean, VA (US)

(72) Inventors: Samuel Sharpe, Cambridge, MA (US); Brian Barr, Schenectady, NY (US); Isha Hameed, McLean, VA (US); Justin Au-Yeung, Somerville, MA (US); Areal Tal, McLean, VA (US); Daniel Barcklow, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 693 days.

This patent is subject to a terminal disclaimer.

(21) Appl. No.: 18/170,724

(22) Filed: Feb. 17, 2023

(65) Prior Publication Data

US 2024/0281701 A1 Aug. 22, 2024

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS

| | | | | |
|---|---|---|---|---|
| 12,332,612 | B2 * | 6/2025 | Joensuu | G05B 13/0265 |
| 2017/0039345 | A1 * | 2/2017 | Röder | G16B 40/20 |
| 2022/0188701 | A1 * | 6/2022 | Röder | G16H 10/60 |
| 2022/0374769 | A1 * | 11/2022 | Sangroya | G06N 20/00 |
| 2023/0049418 | A1 * | 2/2023 | Saha | G06N 3/0464 |
| 2024/0193438 | A1 * | 6/2024 | Carrieri | G06N 20/00 |

* cited by examiner

*Primary Examiner* — Maher N Algibhah
(74) *Attorney, Agent, or Firm* — Foley & Lardner LLP

(57) ABSTRACT

In some aspects, a computing system may generate uninformative features that may be added to a dataset of real features to use as a baseline for determining the quality of an explanation of model output. The uninformative features may be features that do not correlate with what a model is tasked with predicting (e.g., the uninformative features may be random values), and the real features may be informative and correlate with what the model is tasked with predicting (e.g., variables of a dataset sample). A machine learning model may be trained on a dataset that includes both the real features and the uninformative features. The computing system may generate feature attributions for model output, which may include feature attributions for the uninformative features and the real features in the dataset.

20 Claims, 6 Drawing Sheets

210

| | Feature 1 | Feature 2 | ... | Feature N |
|---|---|---|---|---|
| Sample 1 | 0.5 | 0.3 | ... | 0.9 |
| Sample 2 | 0.6 | 0.5 | ... | 0.8 |
| Sample 3 | 0.1 | 0.2 | ... | 0.4 |
| ... | | | | |
| Sample N | 0.8 | 0.3 | ... | 0.3 |

220

222

| | Feature 1 | Feature 2 | ... | Feature N | Feature N+1 | Feature N+2 | Feature N+3 |
|---|---|---|---|---|---|---|---|
| Sample 1 | 0.5 | 0.3 | ... | 0.9 | 0.6 | 0.2 | 0.1 |
| Sample 2 | 0.6 | 0.5 | ... | 0.8 | 0.1 | 0.7 | 0.9 |
| Sample 3 | 0.1 | 0.2 | ... | 0.4 | 0.6 | 0.7 | 0.4 |
| ... | | | | | | | |
| Sample N | 0.8 | 0.3 | ... | 0.3 | 0.5 | 0.8 | 0.1 |

UNCERTAINTY ESTIMATION USING UNINFORMATIVE FEATURES

SUMMARY

Explainable artificial intelligence (XAI) or explainable machine learning includes a set of methods that allows human users to understand why certain results or output was generated by a machine learning model. XAI may be used to explain a machine learning model's reasoning and characterize the strengths and weaknesses of the model's decision-making process. XAI may be necessary to establish trust in the output generated by machine learning models. As an example, for ethical reasons, for legal reasons, and to increase trust, a doctor may need to understand why a machine learning model is recommending a particular procedure for a patient.

Computing systems may attempt to explain artificial intelligence and machine learning by determining the influence a particular feature has on a decision made by a model. For example, systems may generate a value (e.g., an attribution) for each feature in a sample. Each value may indicate the corresponding feature's importance or contribution to a prediction generated by a model. However, existing systems do not provide a way to determine to what degree a particular feature attribution can be trusted because there is no baseline for comparison. Even though an explanation may indicate a feature's contribution to a prediction, the contribution may only be in relation to other features used by the model. This makes it difficult to determine to what extent the explanation is meaningful because there is no frame of reference that is external to the model or the features used by the model. Without a baseline or external frame of reference for comparison, it is difficult to evaluate how meaningful a feature attribution is and to what extent an explanation for model output can be trusted.

To address these issues, non-conventional methods and systems described herein may generate uninformative features that may be added to a dataset of real features to use as a baseline for determining the quality of an explanation of model output. The uninformative features may be features that do not correlate with what a model is tasked with predicting (e.g., the uninformative features may be random values), and the real features may be informative and correlate with what the model is tasked with predicting (e.g., variables of a dataset sample). A machine learning model may be trained on a dataset that includes both the real features and the uninformative features. The computing system may generate feature attributions for model output, which may include feature attributions for the uninformative features and the real features in the dataset. By doing so, the computing system can compare the attributions of uninformative features with the attributions of real features. A real feature that is less influential on the model's output than an uninformative feature may be given less weight for explaining the output because the real feature failed to provide more influence than something that may have been designed to be uninformative. In this way, a computing system may provide a baseline for evaluating feature attributions, thus making machine learning model explanations more effective.

In some aspects, a computing system may obtain a dataset comprising a set of real features and a set of samples, wherein each sample comprises a value for each feature in the set of real features. The computing system may generate, based on the dataset, a set of uninformative features comprising one or more values for each sample in the set of samples, wherein the set of uninformative features are generated such that the uninformative features do not indicate correct classes of samples in the set of samples, wherein the set of uninformative features are combined with the set of real features to form a combined set of features. The computing system may train, based on the dataset and the combined set of features, a machine learning model. The computing system may generate a first local explanation associated with a first sample of the dataset and a first output of the machine learning model, wherein the first local explanation indicates a first ranking of the combined set of features. The computing system may determine, based on the first local explanation, that a first uninformative feature of the set of uninformative features is ranked higher than a first real feature of the set of real features, and wherein the first uninformative feature ranking higher than the first real feature indicates that the first uninformative feature is more influential on the machine learning model. Based on the first uninformative feature ranking higher than the first real feature, the computing system may remove the first real feature from the first local explanation to increase the trustworthiness of the first local explanation.

Further, due to the steadily increasing use of machine learning, it is important to be able to measure how uncertain a model's prediction is. For example, it would be important to know whether a model is uncertain about its identification of an object in the road for autonomous vehicle applications. However, it is difficult for a computing system to measure a confidence or uncertainty level with output a model has generated.

To address these issues, non-conventional methods and systems described herein may use an explanation of model output that ranks uninformative features and real features to determine a degree of uncertainty associated with the model output. Specifically, a computing system may determine that output is more uncertain if uninformative features have a higher degree of influence on model output than real features. A computing system may use a model that has been trained using real and uninformative features. After a new sample for inference has been obtained, the computing system may add uninformative features to the sample and use the model to generate output for the sample. Feature attributions can be generated for the output and may be used to determine how uncertain the model is about the generated output. For example, if more than a threshold number of uninformative features have higher attributions than a set of real features, the computing system may flag the output as being uncertain. By doing so, the computing system may be able to better detect when the model has a high level of uncertainty and may be able to prevent potentially negative consequences associated with the uncertain output by notifying other systems or uses.

In some aspects, a computing system may obtain a machine learning model that has been trained on a dataset comprising a set of uninformative features and a set of real features, wherein the set of uninformative features is generated such that the uninformative features are not correlated with correct labels of samples in the dataset, wherein the set of uninformative features is combined with the set of real features to form a combined set of features. The computing system may obtain a sample for inference, wherein the sample comprises a first set of values corresponding to the set of real features. The computing system may generate, based on the sample, a modified sample, wherein the modified sample comprises the first set of values and a second set of values, wherein the second set of values corresponds to the set of uninformative features. The computing system may generate, based on the modified sample and the machine learning model, a first local explanation indicating a ranking for each feature in the combined set of features. The computing system may determine, based on the ranking, that more than a threshold number of uninformative features of the set of uninformative features are ranked higher than a first real feature of the set of real features. Based on more than the threshold number of uninformative features of the set of uninformative features being ranked higher than the first real feature of the set of real features, the computing system may send a message associated with the machine learning model, wherein the message indicates an uncertainty level of the machine learning model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2A shows an example dataset with real and uninformative features, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
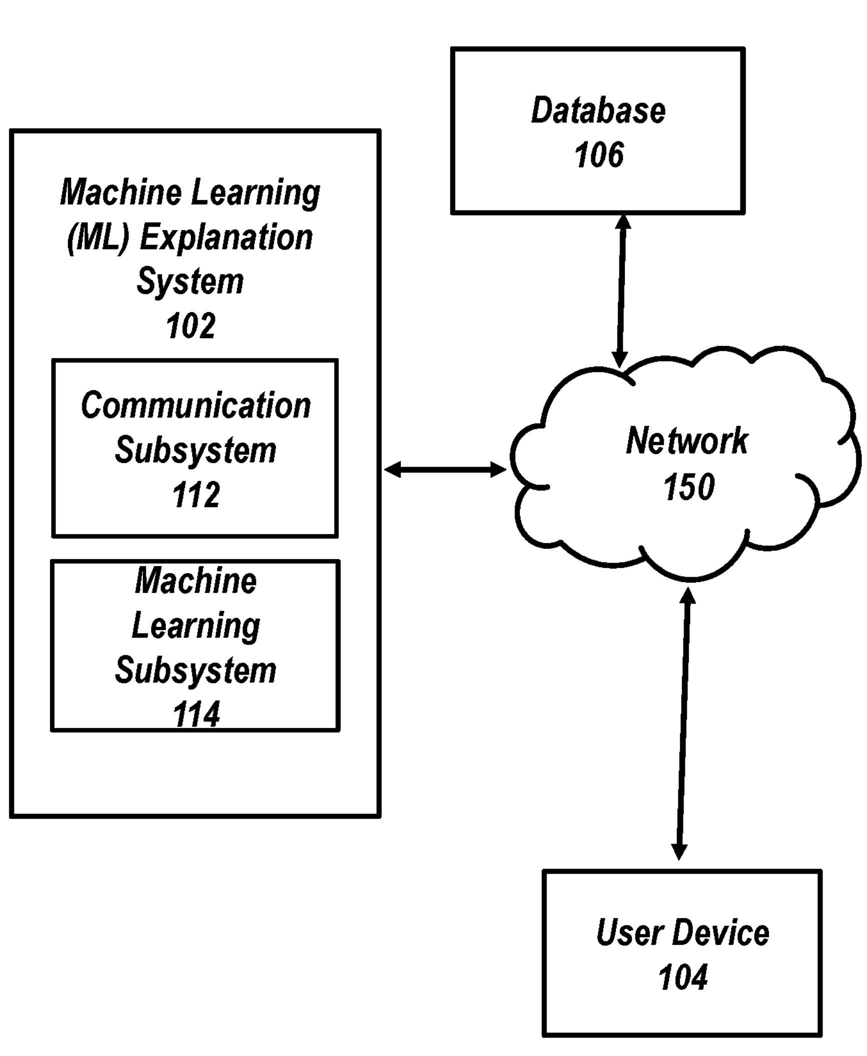
FIG. 1 shows an illustrative diagram for a system that may use uninformative features for explanations or uncertainty measurement, in accordance with one or more embodiments.

FIG. 1 shows an illustrative system 100 for using uninformative features in explanations and for measuring uncertainty in output of a machine learning model. The system 100 may generate uninformative features that may be added to a dataset of real features to use as a baseline for determining the quality of an explanation of model output. The uninformative features may be features that do not correlate with what a model is tasked with predicting (e.g., the uninformative features may be random values) and the real features may be informative and correlate with what the model is tasked with predicting (e.g., variables of a dataset sample). A machine learning model may be trained on a dataset that includes both the real features and the uninformative features. The system 100 may generate feature attributions for model output, which may include feature attributions for the uninformative features and the real features in the dataset. By doing so, the system 100 may compare the attributions of uninformative features with the attributions of real features. A real feature that is less influential on the model's output than an uninformative feature may be given less weight for explaining the output because the real feature failed to provide more influence than something that may have been designed to be uninformative. In this way, the system 100 may provide a baseline for evaluating feature attributions, thus making machine learning model explanations more effective.

The system 100 may include a machine learning (ML) explanation system 102, a user device 104, and a database 106 that may communicate with each other via a network 150. The ML explanation system 102 may include a communication subsystem 112, a machine learning subsystem 114, or other components.

The ML explanation system 102 may obtain a dataset that includes samples and real features. A real feature may be any measurable property or characteristic of a sample. A real feature may be any measurable property or characteristic that can be used to train a model to generate a prediction or classification. The ML explanation system 102 may receive (e.g., from the database 106 and via the network 150) a dataset including a plurality of samples (e.g., as rows in a table) and features (e.g., as columns in a table). In the dataset, each sample may include a value for each feature in the set of real features. For example, each sample in the dataset may correspond to a bank customer. In this example, the features may include credit card debt, income, net worth, age, employment status, marriage status, education level, or a variety of other features. For each sample, the dataset may include a value for each feature. Each sample in the dataset may include a label. A label may be any data that a machine learning model is training or expected to output for a given input sample.

The ML explanation system 102 may generate a set of uninformative features to use with the dataset. An uninformative feature may be a feature that does not correlate with what the model is tasked with predicting. For example, the ML explanation system 102 may generate, based on the dataset, a set of uninformative features. The uninformative features may include one or more values for each sample in the set of samples. The set of uninformative features may be generated such that the uninformative features do not correlate with labels of samples in the set of samples. For example, the values of the uninformative features may be random values. By generating uninformative features, the ML explanation system 102 may use the uninformative features as a baseline with real features. The uninformative features may be used to determine whether a model is relying on uninformative features or real features in its output.

The ML explanation system 102 may determine how many uninformative features to generate or what values the uninformative features should include based on a variety of factors. In some embodiments, the ML explanation system 102 may generate the uninformative features based on the number of real features in the dataset. For example, the ML explanation system 102 may determine a threshold number of features that is less than the number of real features in the dataset. In some embodiments, the ML explanation system 102 may determine how many uninformative features to generate. In one example, the ML explanation system 102 may generate a quantity of uninformative features that is less than or equal to a threshold number of features. The number of uninformative features may be determined based on a size of the dataset. For example, the threshold number of features may be four features if the size is greater than a first threshold size and ten features if the size is greater than a second threshold size.

The ML explanation system 102 may combine the set of uninformative features with the set of real features to form a combined set of features. For example, FIG. 2A shows an example dataset 210 with samples that form the rows of the dataset 210 and features that form the columns. The ML explanation system 102 may generate a set of uninformative features 222. The uninformative features may be randomly generated values. The set of uninformative features may be appended to the dataset 210 to form the dataset 220.

Referring back to FIG. 1, with a combined set of features, the ML explanation system 102 may train a machine learning model and generate explanations for output of the model. The explanations may indicate to what extent uninformative features were relied on by the model and may be used to identify low-quality explanations. For example, if a first explanation for model output indicates more than a threshold attribution for an uninformative feature, the computing system may determine that the first explanation should not be used. The ML explanation system 102 may train a machine learning model, as part of the machine learning subsystem 114. For example, the ML explanation system 102 may train, based on the dataset and the combined set of features, a machine learning model. In one example, the machine learning model may be a supervised machine learning model and that dataset may include labels that indicate a target classification or prediction that the machine learning model should learn to output.

The ML explanation system 102 may generate a first explanation for a sample. As used herein, an explanation may include any indication of why a machine learning model generated output. An explanation may be a local explanation that identifies what features of a single sample were most responsible for corresponding output of a model. The explanation of the sample may provide a view of trends, for example, in customer behavior and/or operational business patterns. An explanation may be obtained using an XAI technique and may include a score that indicates how influential a corresponding feature is in a classification or other output generated by a model (e.g., a machine learning model). For example, an explanation may include Shapley Additive exPlanations (SHAP) values or local interpretable machine learning (LIME) values, or the explanation may be generated using layer-wise relevance propagation techniques, generalized additive model techniques, or a variety of other XAI techniques.

In the explanation, features of the sample may be ranked according to their contributions or how much influence each feature had on a model's output. The ML explanation system 102 may generate a first local explanation associated with a first sample of the dataset and a first output of the machine learning model. The first local explanation may indicate a first ranking of the combined set of features. For example, if there are ten features in the combined set of features, the first local explanation may rank each feature between one and ten. The ranking may be based on how influential each corresponding feature was on generating the first output. By generating a first explanation, the ML explanation system 102 may be able to compare the influence of uninformative features with the influence of real features on the machine learning model. This may enable the ML explanation system 102 to generate better explanations for output because the ML explanation system 102 may be better able to determine how useful real features are by comparing them with uninformative features.

The ML explanation system 102 may determine that a first uninformative feature is ranked higher than a first real feature. For example, the ML explanation system 102 may determine, based on the first local explanation, that the first uninformative feature of the set of uninformative features is ranked higher than the first real feature of the set of real features. The first uninformative feature ranking higher than the first real feature may indicate that the first uninformative feature is more influential on the machine learning model. A higher ranking for the uninformative feature may indicate that the first uninformative feature has a larger contribution in comparison to the first real feature. The feature contribution may be provided as a weight to each feature and may reflect its corresponding feature's impact on the machine learning model output. For example, in predicting a customer's financial stability, a customer's annual income may have a contribution higher than that of the customer's education level. As a result, a higher contribution may be assigned to the customer's annual income in comparison to the customer's education level. The higher ranking of one of the first uninformative features may indicate that the first uninformative feature plays a more important role in training and/or explaining the machine learning model in comparison to the first real feature ranked lower in the first local explanation.

In one example, the machine learning model may be trained to output a probability of default, which may be used to determine whether a user should be approved for a banking product. The banking product may include a checking account, a savings account, a mortgage, a home equity loan, a personal credit card, or a variety of other banking products. An explanation for output generated by the model may indicate four top-ranked (e.g., the four highest-ranked) features that influenced the model to output an 80% chance of default for a first user. In this example, the explanation may indicate that the highest-ranked feature (e.g., the most influential feature) was the first user's credit card debt (e.g., indicating that the credit card debt is too high or higher than a threshold amount), a second-highest-ranked feature is the first user's income (e.g., indicating that the user's income is too low or lower than a threshold amount), a third-highest-ranked feature is a first uninformative feature, and a fourth-highest-ranked feature is the first user's net worth (e.g., indicating that the first user's net worth is too low or lower than a threshold). In this example, the ML explanation system 102 may determine that the feature related to the first user's net worth should not be used to explain why the model output an 80% chance of default for the first user, for example, because the feature related to the first user's net worth is ranked lower than the uninformative feature.

The ML explanation system 102 may remove the first real feature from the first local explanation. For example, the ML explanation system 102 may remove the first real feature, based on the first uninformative feature ranking higher than the first real feature, from the first local explanation. The first real feature may be eliminated from explaining and/or evaluating the output or performance of the machine learning model. For example, the ML explanation system 102 may generate an explanation indicating a plurality of features that were most influential on the output generated by the machine learning model. The ML explanation system 102 may determine that the first real feature should be excluded from the explanation, for example, because the first uninformative feature was ranked higher than the first real feature. This may enable the ML explanation system 102 to make the explanation more accurate or trustworthy.

In some embodiments, the ML explanation system 102 may generate multiple explanations using different techniques and may use the uninformative features to determine which explanation to use. For example, after the first explanation associated with the first sample of the dataset and the first output of the machine learning model has been generated, the ML explanation system 102 may generate a second explanation using a second technique that is different from a first technique used to generate the first explanation. The first explanation and the second explanation may indicate different attributions for the features in the first sample. For example, the first and second explanations may indicate different directions (e.g., positive or negative) and/or magnitudes indicative of the influence that one or more features of the combined set of features has on output of the machine learning model. The second explanation may indicate a second ranking of the combined set of features. The ML explanation system 102 may determine which explanation to use based on how high the uninformative features ranked compared to the real features in each explanation. For example, the ML explanation system 102 may select the second explanation based on the second ranking having fewer uninformative features within a threshold number of top-ranked features of the second ranking. The ML explanation system 102 may define the threshold number of top-ranked features (e.g., four features) for the comparison. In this example, the number of uninformative features ranked within the four top-ranked features (e.g., zero) may be less than the number of uninformative features ranked within the four top-ranked features in the first explanation (e.g., the first explanation may have one uninformative feature in its four top-ranked features and the second explanation may have zero uninformative features in its four top-ranked features). In this example, the ML explanation system 102 may determine that the second explanation is more reliable because the second explanation has fewer uninformative features ranked within the four top-ranked features. The ML explanation system 102 may select the second explanation (e.g., to explain output of the model), for example, because the second explanation has fewer uninformative features ranked within a threshold number of features. In this example, each of the first explanation and the second explanation may include a local explanation.

In some embodiments, the ML explanation system 102 may modify an explanation of machine learning model output by weighting the attributions of real features. Weighting a real feature may be based on the real feature's position in a ranking relative to other real features or other uninformative features. For example, the ML explanation system 102 may generate a first weighting of the first real feature. The ML explanation system 102 may generate the first weighting based on the first uninformative feature ranking higher than the first real feature. For example, the first uninformative feature may have a weighting and may be ranked higher than the first real feature in the first ranking of the combined set of features. The ML explanation system 102 may generate a second weighting of the second real feature. For example, the ML explanation system 102 may generate the second weighting based on the first uninformative feature ranking lower than a second real feature. In this example, the ML explanation system 102 may assign the second real feature the second weighting. The ML explanation system 102 may generate, based on the first weighting and the second weighting, a modified explanation to explain the first output of the machine learning model. For example, the modified explanation may indicate that the second real feature should be used as a primary reason in the modified explanation or that the first real feature should be used as a secondary reason (e.g., with less influence than the primary reason) in the modified explanation.

Additionally or alternatively, the ML explanation system 102 may generate a weighted metric for the first explanation based on the first weighting and the second weighting. For example, the weighted metric can be created to include the first real feature and the second real feature. The weighted metric may be used to compare the first explanation with other explanations. For example, the first explanation may be determined to be more reliable than a second explanation if the weighted metric of the first explanation is greater than a weighted metric of the second explanation.

In some embodiments, the ML explanation system 102 may remove one or more real features from the dataset, for example, based on whether the one or more real features are ranked lower than one or more uninformative features in an explanation. For example, the ML explanation system 102 may remove the first real feature from the dataset based on the first uninformative feature ranking higher than the first real feature. For example, after the first uninformative feature is ranked higher than the first real feature in the first ranking of the combined set of features, the ML explanation system 102 may remove the first real feature from the originally obtained dataset. By doing so, the machine learning model can be trained with more meaningful features to improve the model accuracy and generalization. This may enable the ML explanation system 102 to generate an explanation of the output of the machine learning model that is more reliable, for example, because the explanation relies on sample features that are more effective for generating predictions or classifications (e.g., because less-useful or noisy features are removed from the dataset).

In some embodiments, the ML explanation system 102 may use the uninformative features to determine real features that can be removed from a dataset. The ML explanation system 102 may determine that one or more derivative features (e.g., a first real feature that was derived from a second real feature) are not more influential on a model's output than an uninformative feature. Based on determining that one or more derivative features are not more influential on a model's output than an uninformative feature, the ML explanation system 102 may cease generation of the derivative feature. For example, the ML explanation system 102 may inactivate a feature transformation function used to generate a first real feature, based on a first uninformative feature ranking higher than the first real feature. There may be feature transformation functions corresponding to the set of real features included in the dataset. Inactivating a specific feature transformation function may stop generation of the corresponding real feature in the set of real features. By doing so, the ML explanation system 102 may eliminate the first real feature from the dataset to improve the machine learning model training accuracy, because the first real feature is less useful in comparison to the first uninformative feature.

In some embodiments, the ML explanation system 102 may generate one or more random values for the set of uninformative features. Each value in the set of uninformative features may include a randomly generated value. In one example, the random value may be generated using a pseudorandom number generator (PRNG). The randomly generated values may include discrete random values, continuous random values, or mixed random values.

Figure 2B:
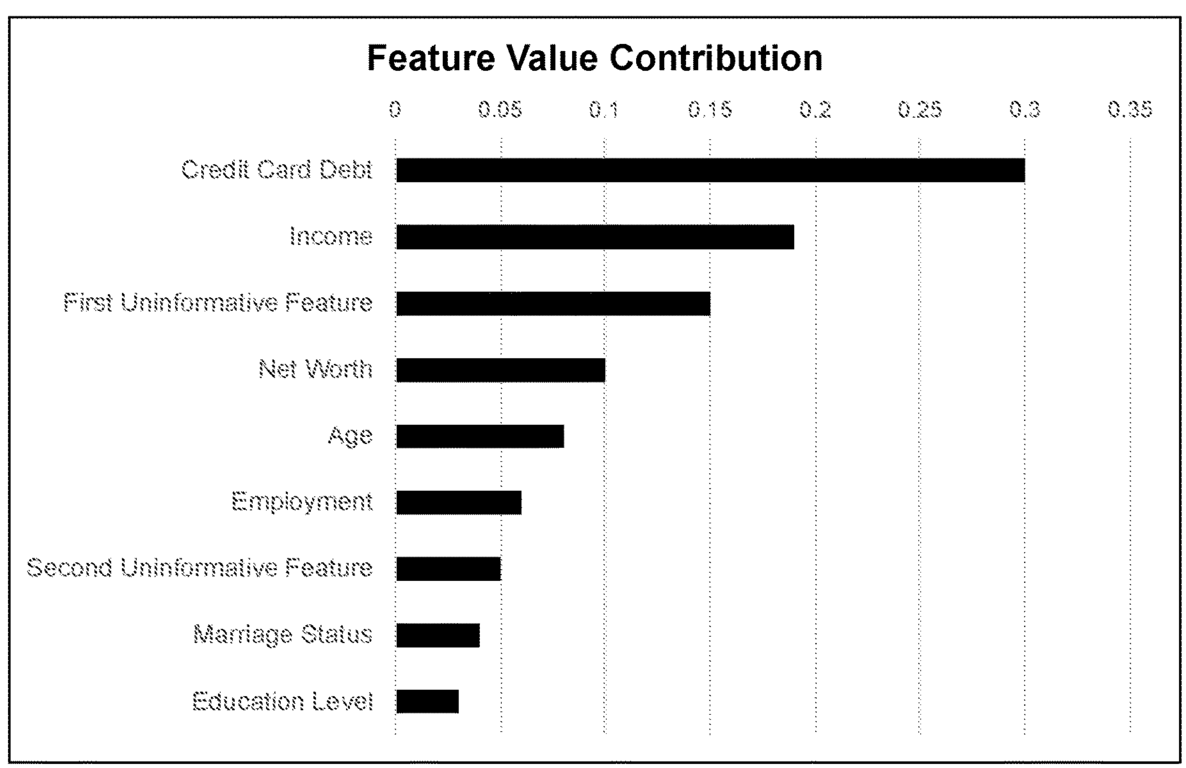
FIG. 2B shows an example explanation with a ranking of feature attributions, in accordance with one or more embodiments.

FIG. 2B shows an example explanation 200B that may be used to determine what features should be used to explain a machine learning model's output. The explanation 200B indicates an amount of influence each feature had on the output that a model generated for a particular sample. The explanation 200B includes a ranking (e.g., by importance) of each feature for the model's output. For example, the explanation 200B indicates that, in order of influence, credit card debt was the most influential feature, followed by income, a first uninformative feature, net worth, age, employment, a second uninformative feature, marriage status, and education level. In this example, the ML explanation system 102 may determine that the credit card debt and income features should be used to explain the model's output for the corresponding sample, but that the other features should not be used because the first uninformative feature was more influential than the other features.

The system 100 may use an explanation of model output that ranks uninformative features and real features to determine a degree of uncertainty associated with the model output. The system 100 may determine that output is more uncertain if uninformative features have a higher degree of influence on model output than real features. The system 100 may use a model that has been trained using real and uninformative features. After a new sample for inference has been obtained, the system 100 may add uninformative features to the sample and use the model to generate output for the sample. Feature attributions can be generated for the output and may be used to determine how uncertain the model is about the generated output. For example, if more than a threshold number of uninformative features have higher attributions than a set of the real features, the system 100 may flag the output as being uncertain. By doing so, the system 100 may be able to better detect when the model has a high level of uncertainty and may be able to prevent potentially negative consequences associated with the uncertain output by notifying other systems or uses.

The ML explanation system 102 may obtain a machine learning model. For example, the ML explanation system 102 may obtain a machine learning model that has been trained on a dataset including a set of uninformative features and a set of real features. The machine learning model may include a variety of models, for example, including classification model, regression model, clustering model, dimensionality reduction model, and/or deep learning model. The dataset may include any data that can be input to the machine learning models for training or testing, including numerical data, categorical data, time series data, and/or text data.

In some embodiments, the machine learning model may have been trained until explanations associated with the machine learning model's output did not include uninformative features within a threshold number of the features as highly ranked features. For example, the ML explanation system 102 may have determined that the machine learning model had sufficient training after generating an explanation for output of the model and determining that none of the top features were uninformative features (e.g., only real features ranked high enough to be in a threshold number (e.g., four, three, seven, etc.) of features). In one example, a second local explanation may indicate that less than a threshold number of uninformative features are ranked higher than a first real feature, wherein the second local explanation corresponds to a training sample of the dataset.

The ML explanation system 102 may obtain a sample for inference. For example, the ML explanation system 102 may obtain a sample that comprises a first set of values corresponding to the set of real features for inference through the machine learning model. The first set of values may be contributions of corresponding real features. In one example, the sample may be a sample that was obtained for use in connection with a machine learning model that was deployed to production.

The ML explanation system 102 may generate a modified sample. For example, the ML explanation system 102 may generate the modified sample based on the obtained sample. The modified sample may include the first set of values corresponding to the real features and a second set of values corresponding to uninformative features. For example, the ML explanation system 102 may append the second set of values to the first set of values to generate the modified sample. In some embodiments, the second set of values may include randomly generated numbers or characters. By generating a modified sample, the ML explanation system 102 may be better able to measure uncertainty in output of the machine learning model. For example, by ranking attributions (e.g., attributions to model output) of the uninformative features and the real features, the ML explanation system 102 may be able to determine to what extent the machine learning model is relying on uninformative features. If the machine learning model is relying on uninformative features (e.g., if there are more than a threshold number of uninformative features within a threshold number of top-ranked features), then the ML explanation system 102 may determine that the machine learning model is uncertain.

The ML explanation system 102 may generate a first explanation. For example, the first explanation may be generated based on the modified sample and the machine learning model. The first explanation may include information related to the real features and the uninformative features. The first explanation may indicate a ranking for each feature in the combined set of features. For example, the real features and the uninformative features may be ranked in the first explanation according to their respective contributions or influence on the machine learning model's output (e.g., as described above in connection with FIG. 2B).

The ML explanation system 102 may determine that an uninformative feature is ranked higher than a real feature. For example, the ML explanation system 102 may determine that more than a threshold number of uninformative features are ranked higher than a first real feature. As an additional example, the ML explanation system 102 may determine, based on the ranking (e.g., the ranking indicated by the first explanation), that more than a threshold number of uninformative features of the set of uninformative features are ranked higher than a first real feature of the set of real features. The ML explanation system 102 may define the threshold number of uninformative features (e.g., three features, five features, ten features, twenty features, etc.). The ML explanation system 102 can determine whether there are more than the threshold number of uninformative features ranked higher than a real feature of the ranking. By doing so, the ML explanation system 102 may be able to determine a level of uncertainty in the machine learning model's output. For example, if uninformative features rank higher than real features in an explanation, then the ML explanation system 102 may determine that the model's output has a high degree (e.g., higher than a threshold level) of uncertainty. As an additional example, if real features rank higher than uninformative features, the ML explanation system 102 may determine that the model's output has a low degree (e.g., lower than a threshold level) of uncertainty. In this way, the ML explanation system 102 may be better able to assess the certainty of a machine learning model's output and make corrections or send alerts, for example, if the machine learning model has a high degree of uncertainty.

The ML explanation system 102 may send a message associated with the machine learning model. The ML explanation system 102 may send the message, for example, based on more than the threshold number of uninformative features of the set of uninformative features being ranked higher than the first real feature of the set of real features. For example, if the ML explanation system 102 has determined that there are more than the threshold number (e.g., five) of uninformative features ranked higher than the first real feature in the ranking, the ML explanation system 102 may send a message indicating that the machine learning model's output was uncertain (e.g., the output was associated with more than a threshold level of uncertainty). Additionally or alternatively, the message may indicate that the output of the machine learning model should not be used or should be adjusted or otherwise corrected. The message sent by the ML explanation system 102 may indicate an uncertainty level of the machine learning model. By doing so, the ML explanation system 102 may prevent negative consequences that may occur as the result of uncertain machine learning model output. For example, the ML explanation system 102 may prevent a banking product from being approved or disapproved due to the uncertainty level of the model output.

In some embodiments, the ML explanation system 102 may wait to send a message until multiple explanations show that output of the machine learning model is uncertain. In this way, the ML explanation system 102 may avoid sending false alarms (e.g., messages that indicate problems with the machine learning model) based on a single outlier. For example, the ML explanation system 102 may obtain a set of samples (e.g., a batch of samples). Each sample in the set of samples may be obtained for use in connection with a machine learning model deployed to production. The ML explanation system 102 may generate (e.g., via the machine learning model) separate output for each sample in the set of samples. The ML explanation system 102 may generate a set of explanations that includes an explanation for each output. Based on a set of explanations associated with the set of samples, the ML explanation system 102 may determine that each sample in the set of samples has more than a threshold number of uninformative features ranked higher than a subset of the set of real features. Each explanation of the set of explanations may be generated utilizing different techniques. Each explanation of the set of explanations may include a ranking of a combined set of features for each sample of the set of samples. The ML explanation system 102 may define a subset of the set of real features. The subset of the set of real features may include a threshold number of features that have larger contributions to the output of the machine learning model than any other real features. The feature contribution may be provided as a weight to each feature and may reflect its corresponding feature's impact on the machine learning model output. In one example, each feature in the subset of the set of real features may be ranked higher than any uninformative features in an explanation of the machine learning model's output. The ML explanation system 102 may send the message based on each sample in the set of samples having more than a threshold number of uninformative features ranked higher than the subset of the set of real features. For example, the ML explanation system 102 may send a message indicating that the machine learning model's output is not reliable because, for every sample of the set of samples, there is at least one uninformative feature ranking higher than the defined subset of real features in corresponding explanations.

In some embodiments, the ML explanation system 102 may send a message relevant to a variation of samples sent to the machine learning model. The message may indicate the sensitivity of the machine learning model to incoming data samples. For example, the ML explanation system 102 may determine a first variation associated with the dataset. The first variation can be estimated based on contributions of all features of the set of uninformative features and the set of real features included in the dataset, which is configured for the machine learning model training. In one example, the first variation can be calculated through finding a mean value of the contributions of the combined set of features, squaring each feature's deviation from the mean value, and dividing a sum of the squares by a quantity of the features. The ML explanation system 102 may determine a second variation based on a batch of samples including the modified sample. The second variation may be estimated based on contributions of all features of the modified samples including the real features and uninformative features obtained for the machine learning model inferencing. In one example, the second variation can be calculated through finding a mean value of the contributions of the real features and uninformative features included in the modified sample, squaring each feature's deviation from the mean value, and dividing a sum of the squares by a quantity of the features. The ML explanation system 102 may send the message based on the second variation being different from the first variation. For example, the message may indicate that the machine learning model's output is uncertain because the input data for the inference has a higher variation in comparison to that for the training. The lower data sample quality may degrade the performance of the machine learning model, therefore affecting the accuracy of features ranking in explanation. By doing so, the ML explanation system 102 may prevent unreliable output from the machine learning model caused by degraded test dataset variation.

In some embodiments, the ML explanation system 102 may send a message based on an uncertainty level associated with output of the machine learning model. For example, the ML explanation system 102 may determine that the uncertainty level associated with the machine learning model satisfies a threshold uncertainty level. This determination may be based on the ranking for the one or more features in the combined set of features. In one example, the ML explanation system 102 may define the threshold uncertainty level as having three or fewer uninformative features in the top ten features ranking list. In an explanation of the machine learning model output, there may be three or more uninformative features that are ranked in the top-ranked ten features. In this example, the ML explanation system 102 may determine that the threshold uncertainty level is satisfied because there are more than the threshold number of uninformative features included in the top-ranked ten features. The ML explanation system 102 may send a message indicating that the uncertainty level satisfies the threshold uncertainty level. For example, the ML explanation system 102 may send a message revealing that the machine learning model's output is unreliable.

In some embodiments, data (e.g., the distribution of data) may shift and/or change over time. For example, data may shift after the machine learning model is trained and may cause a performance degradation of the machine learning model. The ML explanation system 102 may determine that data has shifted based on the ranking of uninformative features and may send a message associated with the dataset shift. For example, the ML explanation system 102 may determine that a shift in distribution of samples satisfies a threshold distribution shift, based on the ranking for the one or more features in the combined set of features. In one example, contributions of real features may be reduced in comparison to the uninformative features in the ranking of the combined set of features. The relative reduction of real features contributions may lead to an increased number of uninformative features ranking higher in the evaluation. The ML explanation system 102 may equate the threshold distribution shift to a defined number of uninformative features ranking higher, e.g., three uninformative features ranked within the top ten features. By reviewing the features ranking in the machine learning model output evaluation, the ML explanation system 102 can determine that the sample shift, between the training datasets and the testing datasets, is less than the threshold distribution shift because there are a smaller number of uninformative features ranking higher than the defined number of uninformative features. The ML explanation system 102 may send the message indicating that the shift in distribution satisfies the threshold distribution shift. For example, the ML explanation system 102 may send the message revealing that the machine learning model performance is not degraded because the dataset shift is lower than the threshold distribution shift. By doing so, the ML explanation system 102 can monitor the performance of the machine learning model and retrain the machine learning model to prevent negative effects (e.g., loss in accuracy, precision, recall, etc.) that may occur as a result of data shift.

Figure 3:
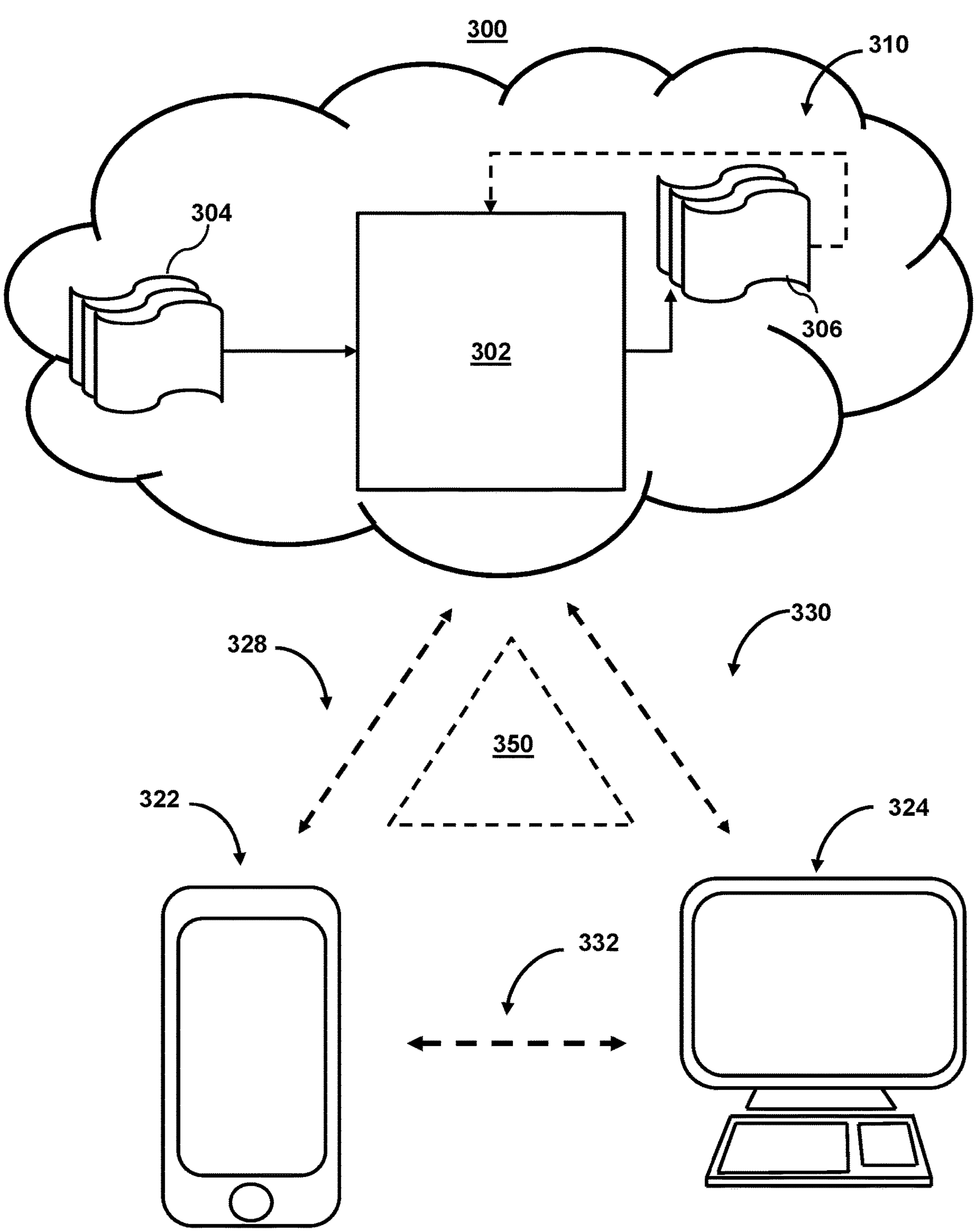
FIG. 3 shows illustrative components for a system that may be used to confirm events, in accordance with one or more embodiments.

FIG. 3 shows illustrative components for a system 300 used for training machine learning models or using machine learning models (e.g., to confirm whether an event has occurred or perform any other action described in connection with FIGS. 1-2B, and 4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2B and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to training machine learning models, or any other action described in connection with FIGS. 1-2B, and 4).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to training machine learning models or using machine learning models (e.g., to confirm whether an event has occurred or perform any other action described in connection with FIGS. 1-2B, and 4).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the ML explanation system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., used for training machine learning models or using machine learning models, for example, to confirm whether an event has occurred or perform any other action described in connection with FIGS. 1-2B, and 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to confirm whether an event has occurred or perform any other action described in connection with FIGS. 1-2B, and 4.

System 300 also includes application programming interface (API) layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
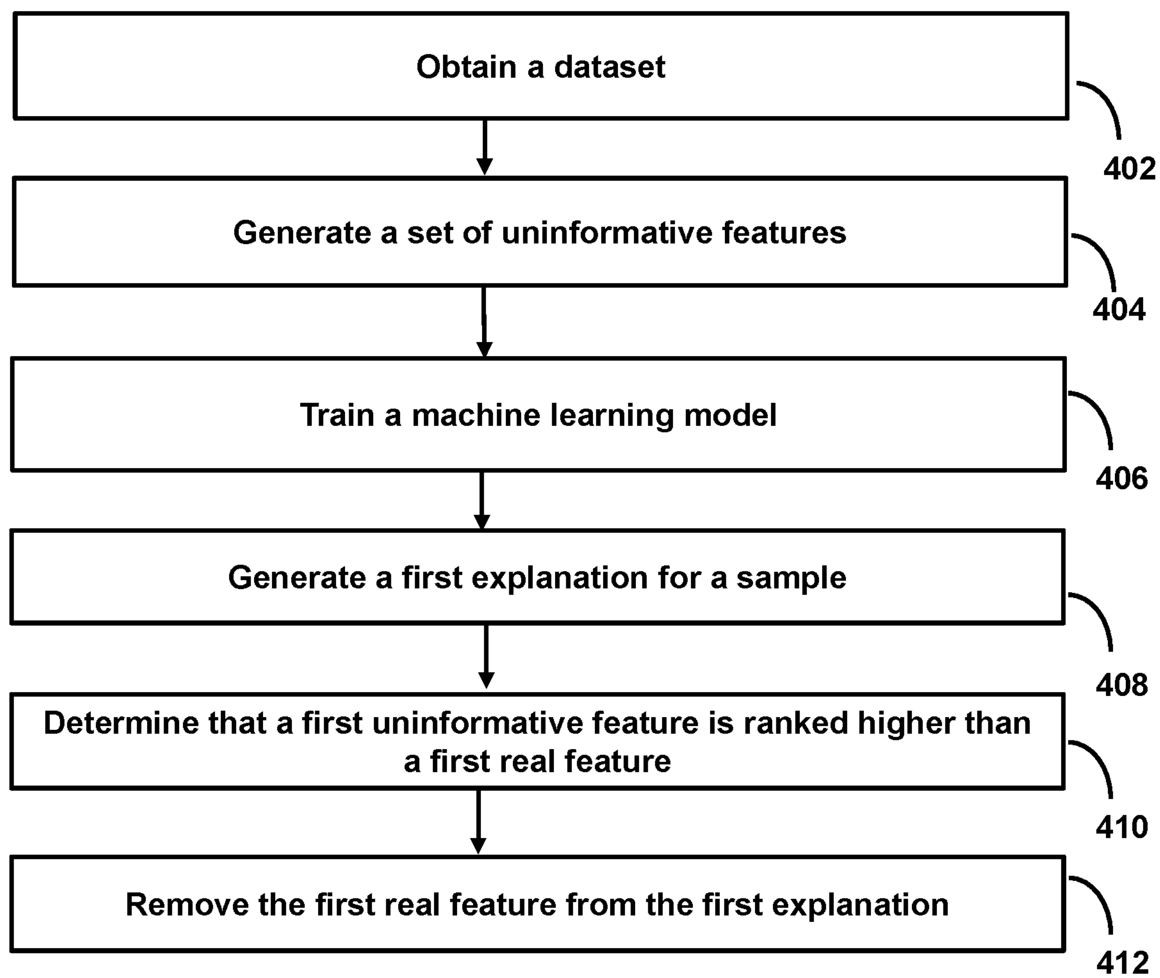
FIG. 4 shows a flowchart of the steps involved in using uninformative features for explanations of model output, in accordance with one or more embodiments.

FIG. 4 shows a flowchart of the steps involved in determining efficacy of explanations of machine learning model output through use of uninformative features, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, the computing system may obtain a dataset. The computing system may obtain a dataset that comprises a set of real features and a set of samples. For example, the computing system may receive a dataset including a plurality of user samples and a plurality of features corresponding to each of the plurality of user samples. In the dataset, each sample may comprise a value for each feature in the set of real features. For example, an integer ranging from 1 to 10 may be assigned to the age feature of the customer in the dataset. In another example, 0 or 1 can be assigned to the marriage status feature of the customer sample in the dataset, indicating an unmarried and a married status, respectively.

At step 404, the computing system may generate a set of uninformative features. For example, the computing system may generate, based on the dataset, a set of uninformative features. The uninformative features may include one or more values for each sample in the set of samples. The set of uninformative features may be generated such that the uninformative features do not correlate with labels of samples in the set of samples. For example, the values of the uninformative features may be random values. By generating uninformative features, the computing system may use the uninformative features as a baseline with real features and may detect what features are influential on a machine learning model's output. The computing system may combine the set of uninformative features with the set of real features to form a combined set of features.

The computing system may determine how many uninformative features to generate or what values the uninformative features should include based on a variety of factors. In some embodiments, the computing system may generate the uninformative features based on the number of real features in the dataset. For example, the computing system may determine a threshold number of features that is less than the number of real features in the dataset. In some embodiments, the computing system may determine how many uninformative features to generate. In one example, the computing system may generate a quantity of uninformative features that is less than or equal to a threshold number of features. The number of uninformative features may be determined based on a size of the dataset.

At step 406, the computing system may train a machine learning model. For example, the computing system may train, based on the dataset and the combined set of features, a machine learning model. The machine learning model may be any model described above in connection with FIGS. 1-3. In one example, the machine learning model may be a supervised machine learning model and that dataset may include labels that indicate a target classification or prediction that the machine learning model should learn to output.

At step 408, the computing system may generate a first explanation for a sample. For example, the computing system may generate a first local explanation associated with a first sample of the dataset and a first output of the machine learning model. The first local explanation may indicate a first ranking of the combined set of features. For example, if there are ten features in the combined set of features, the first local explanation may rank each feature between one and ten. The ranking may be based on how influential each corresponding feature was on generating the first output. The first explanation (e.g., the first local explanation) may be any explanation described above in connection with FIGS. 1-3. By generating a first explanation, the computing system may be able to compare the influence of uninformative features with the influence of real features on the machine learning model. This may enable the computing system to generate better explanations for output because the computing system may be better able to determine how useful real features are by comparing them with uninformative features.

At step 410, the computing system may determine that a first uninformative feature is ranked higher than a first real feature. For example, the computing system may determine, based on the first local explanation, that the first uninformative feature of the set of uninformative features is ranked higher than the first real feature of the set of real features. The first uninformative feature ranking higher than the first real feature may indicate that the first uninformative feature is more influential on the machine learning model. A higher ranking for the uninformative feature may indicate that the first uninformative feature has a larger contribution in comparison to the first real feature. The higher ranking of one of the first uninformative features may indicate that the first uninformative feature plays a more important role in training and/or explaining the machine learning model in comparison to the first real feature ranked lower in the first local explanation.

In one example, the machine learning model may be trained to output a probability of default, which may be used to determine whether a user should be approved for a banking product. An explanation for output generated by the model may indicate four top-ranked (e.g., the four highest-ranked) features that influenced the model to output an 80% chance of default for a first user. In this example, the explanation may indicate that the highest-ranked feature (e.g., the most influential feature) was the first user's credit card debt (e.g., indicating that the credit card debt is too high or higher than a threshold amount), a second-highest-ranked feature is the first user's income (e.g., indicating that the user's income is too low or lower than a threshold amount), a third-highest-ranked feature is a first uninformative feature, and a fourth-highest-ranked feature is the first user's net worth (e.g., indicating that the first user's net worth is too low or lower than a threshold). In this example, the computing system may determine that the feature related to the first user's net worth should not be used to explain why the model output an 80% chance of default for the first user, for example, because the feature related to the first user's net worth is ranked lower than the uninformative feature.

At step 412, the computing system may remove the first real feature from the first local explanation. For example, the computing system may remove the first real feature, based on the first uninformative feature ranking higher than the first real feature, from the first local explanation. The first real feature may be eliminated from explaining and/or evaluating the output or performance of the machine learning model. For example, the computing system may generate an explanation indicating a plurality of features that were most influential on the output generated by the machine learning model. The computing system may determine that the first real feature should be excluded from the explanation, for example, because the first uninformative feature was ranked higher than the first real feature. This may enable the computing system to increase a trustworthiness of the first local explanation.

In some embodiments, the computing system may generate multiple explanations using different techniques and may use the uninformative features to determine which explanation to use. For example, after the first explanation associated with the first sample of the dataset and the first output of the machine learning model has been generated, the computing system may generate a second explanation using a second technique that is different from a first technique used to generate the first explanation. The first explanation and the second explanation may indicate different attributions for the features in the first sample. For example, the first and second explanations may indicate different directions (e.g., positive or negative) and/or magnitudes indicative of the influence that one or more features of the combined set of features has on output of the machine learning model. The second explanation may indicate a second ranking of the combined set of features. The computing system may determine which explanation to use based on how high the uninformative features ranked compared to the real features in each explanation. For example, the computing system may select the second explanation based on the second ranking having fewer uninformative features within a threshold number of top-ranked features of the second ranking. The computing system may define the threshold number of top-ranked features (e.g., four features) for the comparison. In this example, the number of uninformative features ranked within the four top-ranked features (e.g., zero) may be less than the number of uninformative features ranked within the four top-ranked features in the first explanation (e.g., the first explanation may have one uninformative feature in its four top-ranked features and the second explanation may have zero uninformative features in its four top-ranked features). In this example, the computing system may determine that the second explanation is more reliable because the second explanation has fewer uninformative features ranked within the four top-ranked features. The computing system may select the second explanation (e.g., to explain output of the model), for example, because the second explanation has fewer uninformative features ranked within a threshold number of features. In this example, each of the first explanation and the second explanation may include a local explanation.

In some embodiments, the computing system may modify an explanation of machine learning model output by weighting the attributions of real features. Weighting a real feature may be based on the real feature's position in a ranking relative to other real features or other uninformative features. For example, the computing system may generate a first weighting of the first real feature. The computing system may generate the first weighting based on the first uninformative feature ranking higher than the first real feature. For example, the first uninformative feature may have a weighting and may be ranked higher than the first real feature in the first ranking of the combined set of features. The computing system may generate a second weighting of the second real feature. For example, the computing system may generate the second weighting based on the first uninformative feature ranking lower than a second real feature. In this example, the computing system may assign the second real feature the second weighting. The computing system may generate, based on the first weighting and the second weighting, a modified explanation to explain the first output of the machine learning model. For example, the modified explanation may indicate that the second real feature should be used as a primary reason in the modified explanation or that the first real feature should be used as a secondary reason (e.g., with less influence than the primary reason) in the modified explanation.

Additionally or alternatively, the computing system may generate a weighted metric for the first explanation based on the first weighting and the second weighting. For example, the weighted metric can be created to include the uninformative feature, the first real feature, or the second real feature. Their orders in the metric may be arranged in accordance with their weightings. The weighted metric may be used to compare the first explanation with other explanations. For example, the first explanation may be determined to be more reliable than a second explanation if the weighted metric of the first explanation is greater than a weighted metric of the second explanation.

In some embodiments, the computing system may remove one or more real features from the dataset, for example, based on whether the one or more real features are ranked lower than one or more uninformative features in an explanation. For example, the computing system may remove the first real feature from the dataset based on the first uninformative feature ranking higher than the first real feature. For example, after the first uninformative feature is ranked higher than the first real feature in the first ranking of the combined set of features, the computing system may remove the first real feature from the originally obtained dataset. By doing so, the machine learning model can be trained with more meaningful features to improve the model accuracy. This may enable a computing system to generate an explanation of the output of the machine learning model that is more reliable, for example, because the explanation relies on sample features that are more effective for generating predictions or classifications (e.g., because less-useful features are removed from the dataset).

In some embodiments, the computing system may use the uninformative features to determine real features that can be removed from a dataset. The computing system may determine that one or more derivative features (e.g., a first real feature that was derived from a second real feature) are not more influential on a model's output than an uninformative feature. Based on determining that one or more derivative features are not more influential on a model's output than an uninformative feature, the computing system may cease generation of the derivative feature. For example, the computing system may inactivate a feature transformation function used to generate a first real feature, based on a first uninformative feature ranking higher than the first real feature. There may be feature transformation functions corresponding to the set of real features included in the dataset. Inactivating a specific feature transformation function may stop generation of the corresponding real feature in the set of real features. By doing so, the computing system may eliminate the first real feature from the dataset to improve the machine learning model training accuracy, because the first real feature is less useful in comparison to the first uninformative feature.

In some embodiments, the computing system may generate one or more random values for the set of uninformative features. Each value in the set of uninformative features may include a randomly generated value. The randomly generated values may include discrete random values, continuous random values, or mixed random values.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
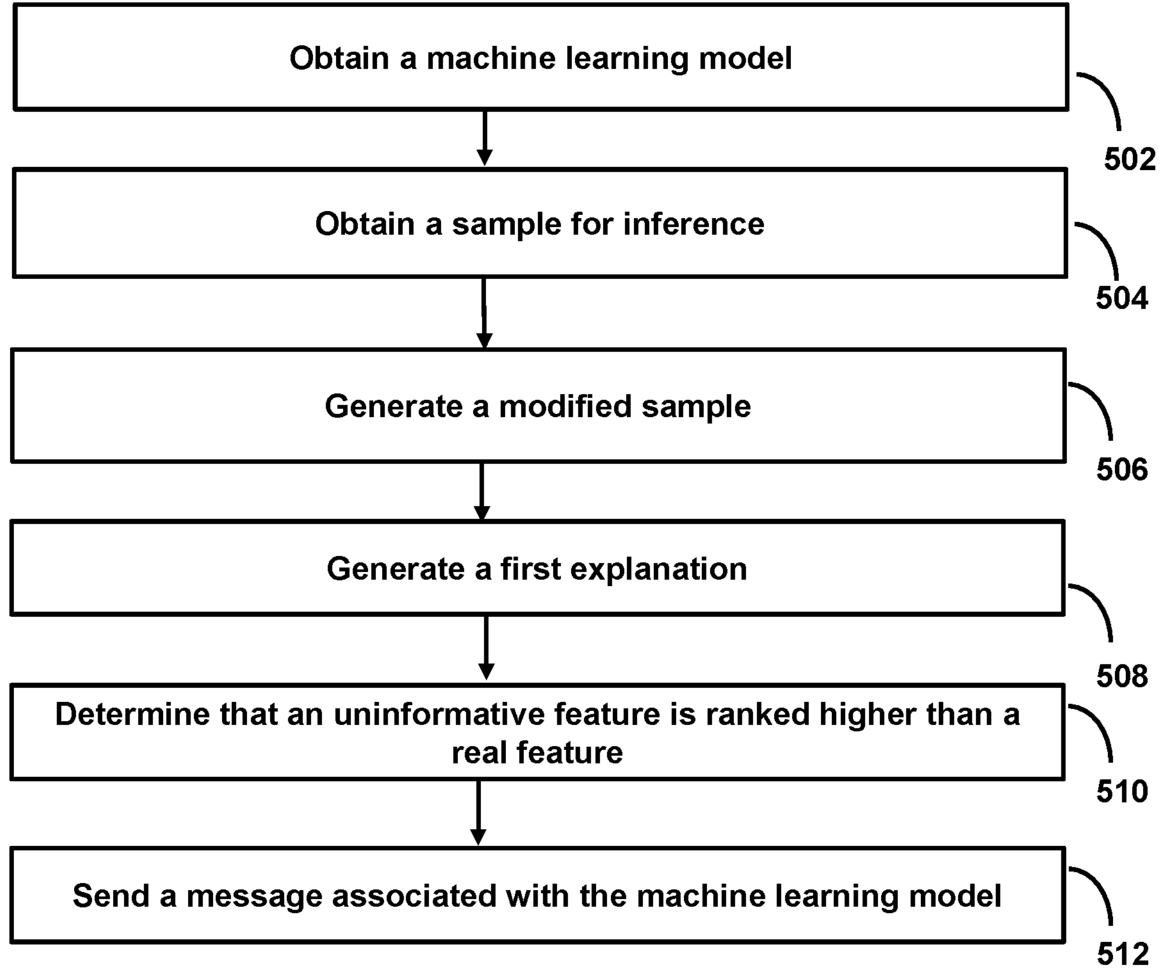
FIG. 5 shows a flowchart of the steps involved in using uninformative features for explanations of model output, in accordance with one or more embodiments.

FIG. 5 shows a flowchart of the steps involved in measuring uncertainty in output of a machine learning model through use of uninformative features, in accordance with one or more embodiments. Although described as being performed by a computing system, one or more actions described in connection with process 500 of FIG. 5 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 502, the computing system may obtain a machine learning model. For example, the computing system may obtain a machine learning model that has been trained on a dataset including a set of uninformative features and a set of real features. The machine learning model may include any model described above in connection with FIGS. 1-3. The dataset may be any dataset described above in connection with FIGS. 1-3. The set of uninformative features may be generated such that the uninformative features are not correlated with correct labels of samples in the set of samples. For example, the uninformative features may include random values. The set of uninformative features may be combined with the set of real features to form a combined set of features. The combined set of features may be included in the dataset for training of the machine learning model.

In some embodiments, the machine learning model may have been trained until explanations associated with the machine learning model's output no longer included uninformative features within a threshold number of the features as highly ranked features. For example, the computing system may have determined that the machine learning model had sufficient training after generating an explanation for output of the model and determining that none of the top features were uninformative features (e.g., only real features ranked high enough to be in a threshold number (e.g., four, three, seven, etc.) of features). In one example, a second local explanation may indicate that less than a threshold number of uninformative features are ranked higher than a first real feature, wherein the second local explanation corresponds to a training sample of the dataset.

At step 504, the computing system may obtain a sample for inference. For example, the computing system may obtain a sample that comprises a first set of values corresponding to the set of real features for inference through the machine learning model. The first set of values may be contributions of corresponding real features. In one example, the sample may be a sample that was obtained for use in connection with a machine learning model that was deployed to production.

At step 506, the computing system may generate a modified sample. For example, the computing system may generate the modified sample based on the sample obtained in step 504. The modified sample may include the first set of values corresponding to the real features and a second set of values corresponding to uninformative features. For example, the computing system may append the second set of values to the first set of values to generate the modified sample. In some embodiments, the second set of values may include randomly generated numbers or characters. By generating a modified sample, the computing system may be better able to measure uncertainty in output of the machine learning model. For example, by ranking attributions (e.g., attributions to model output) of the uninformative features and the real features, the computing system may be able to determine to what extent the machine learning model is relying on uninformative features. If the machine learning model is relying on uninformative features (e.g., if there are more than a threshold number of uninformative features within a threshold number of top-ranked features), then the computing system may determine that the machine learning model is uncertain.

At step 508, the computing system may generate a first explanation. For example, the first explanation may be generated based on the modified sample and the machine learning model. The first explanation may include information related to the real features and the uninformative features. The first explanation may indicate a ranking for each feature in the combined set of features. For example, the real features and the uninformative features may be ranked in the first explanation according to their respective contributions to or influence on the machine learning model's output (e.g., as described above in connection with FIG. 2B).

At step 510, the computing system may determine that an uninformative feature is ranked higher than a real feature. For example, the computing system may determine that more than a threshold number of uninformative features are ranked higher than a first real feature. As an additional example, the computing system may determine, based on the ranking (e.g., the ranking of features of the explanation generated in step 508), that more than a threshold number of uninformative features of the set of uninformative features are ranked higher than a first real feature of the set of real features. The computing system may define the threshold number of uninformative features (e.g., three features, five features, ten features, twenty features, etc.). The computing system can determine whether there are more than the threshold number of uninformative features ranked higher than a real feature of the ranking. By doing so, the computing system may be able to determine a level of uncertainty in the machine learning model's output. For example, if uninformative features rank higher than real features in an explanation, then the computing system may determine that the model's output has a high degree (e.g., higher than a threshold level) of uncertainty. As an additional example, if real features rank higher than uninformative features, the computing system may determine that the model's output has a low degree (e.g., lower than a threshold level) of uncertainty. In this way, the computing system may be better able to assess the certainty of a machine learning model's output and make corrections or send alerts, for example, if the machine learning model has a high degree of uncertainty.

At step 512, the computing system may send a message associated with the machine learning model. The computing system may send a message associated with the machine learning model, for example, based on more than the threshold number of uninformative features of the set of uninformative features being ranked higher than the first real feature of the set of real features. For example, if the computing system has determined that there are more than the threshold number (e.g., five) of uninformative features ranked higher than the first real feature in the ranking, the computing system may send a message indicating the machine learning model's output was uncertain (e.g., the output was associated with more than a threshold level of uncertainty). Additionally or alternatively, the message may indicate that the output of the machine learning model should not be used or should be adjusted or otherwise corrected. The message sent by the computing system may indicate an uncertainty level of the machine learning model. By doing so, the computing system may prevent negative consequences that may occur as the result of uncertain machine learning model output. For example, the computing system may prevent a banking product from being approved or disapproved due to the uncertainty level of the model output.

In some embodiments, the computing system may wait to send a message until multiple explanations show that output of the machine learning model is uncertain. In this way, the computing system may avoid sending false alarms (e.g., messages that indicate problems with the machine learning model) based on a single outlier. For example, the computing system may obtain a set of samples (e.g., a batch of samples). Each sample in the set of samples may be obtained for use in connection with a machine learning model deployed to production. The computing system may generate (e.g., via the machine learning model) separate output for each sample in the set of samples. The computing system may generate a set of explanations that includes an explanation for each output. Based on a set of explanations associated with the set of samples, the computing system may determine that each sample in the set of samples has more than a threshold number of uninformative features ranked higher than a subset of the set of real features. Each explanation of the set of explanations may be generated utilizing different techniques. Each explanation of the set of explanations may include a ranking of a combined set of features for each sample of the set of samples. The computing system may define a subset of the set of real features. The subset of the set of real features may include a threshold number of features that have larger contributions to output of the machine learning model than any other real features. In one example, each feature in the subset may be ranked higher than any uninformative features in an explanation of the machine learning model's output. The computing system may send the message based on each sample in the set of samples having more than a threshold number of uninformative features ranked higher than the subset of the set of real features. For example, the computing system may send a message indicating the machine learning model's output is not reliable because, for every sample of the set of samples, there is at least one uninformative feature ranking higher than the defined subset of real features in corresponding explanations.

In some embodiments, the computing system may send a message indicating attribution weights of real features. The weighting of a real feature may be based on the real feature's position in a ranking relative to other real features or other uninformative features. For example, the computing system may generate a first weighting of the first real feature. The computing system may generate the first weighting of the first real feature based on the first uninformative feature ranking higher than the first real feature. For example, the first uninformative feature may have a weighting and may be ranked higher than the first real feature in the first ranking of the combined set of features. The computing system may generate a second weighting of a second real feature. For example, the computing system may generate the second weighting of the second real feature based on the first uninformative feature ranking lower than the second real feature. In this example, the computing system may assign the second real feature the second weighting. The computing system may generate, based on the first weighting and the second weighting, a modified explanation to explain the first output of the machine learning model. For example, the modified explanation may indicate that the second real feature should be used as a primary reason in the modified explanation or that the first real feature should be used as a secondary reason (e.g., with less influence than the primary reason) in the modified explanation. Additionally, the computing system may send a message based on the first weighting and the second weighting. For example, the message may indicate using the second real feature as a primary reason for the explanation because the second weighting of the second real feature is larger than the first weighting of the first real feature.

In some embodiments, the computing system may send a message relevant to a variation of samples sent to the machine learning model. The message may indicate the sensitivity of the machine learning model to incoming data samples. For example, the computing system may determine a first variation associated with the dataset. The first variation can be estimated based on contributions of all features of the set of uninformative features and the set of real features included in the dataset, which is configured for the machine learning model training. In one example, the first variation can be calculated through finding a mean value of the contributions of the combined set of features, squaring each feature's deviation from the mean value, and dividing a sum of the squares by a quantity of the features. The computing system may determine a second variation based on a batch of samples including the modified sample. The second variation may be estimated based on contributions of all features of the modified samples, including the real features and uninformative features obtained for the machine learning model inferencing. In one example, the second variation can be calculated through finding a mean value of the contributions of the real features and uninformative features included in the modified sample, squaring each feature's deviation from the mean value, and dividing a sum of the squares by a quantity of the features. The computing system may send the message based on the second variation being different from the first variation. For example, the message may indicate that the machine learning model's output is uncertain because the input data for the inference has a higher variation in comparison to that for the training. The lower data sample quality may degrade the performance of the machine learning model, therefore affecting the accuracy of features ranking in explanation. By doing so, the computing system may prevent unreliable output from the machine learning model caused by degraded test dataset variation.

In some embodiments, the computing system may send a message based on an uncertainty level associated with output of the machine learning model. For example, the computing system may determine that the uncertainty level associated with the machine learning model satisfies a threshold uncertainty level. This determination may be based on the ranking for the one or more features in the combined set of features. In one example, the computing system may define the threshold uncertainty level as having three or fewer uninformative features in the top ten features ranking list. In an explanation of the machine learning model output, there may be three or more uninformative features that are ranked in the top ten features. In this example, the computing system may determine that the threshold uncertainty level is satisfied because there are more than the threshold number of uninformative features ranked in the top ten features. The computing system may send a message indicating that the uncertainty level satisfies the threshold uncertainty level. For example, the computing system may send a message revealing that the machine learning model's output is unreliable.

In some embodiments, data may shift (e.g., the distribution of data) and/or change over time. For example, data may shift after the machine learning model is trained and may cause a performance degradation of the machine learning model. The computing system may determine that data has shifted based on the ranking of uninformative features and may send a message associated with the dataset shift. For example, the computing system may determine that a shift in distribution of samples satisfies a threshold distribution shift, based on the ranking for the one or more features in the combined set of features. In one example, contributions of real features may be reduced in comparison to the uninformative features in the ranking of the combined set of features. The relative reduction of real features contributions may lead to an increased number of uninformative features ranking higher in the evaluation. The computing system may equate the threshold distribution shift to a defined number of uninformative features ranking higher, e.g., three uninformative features ranked within the top ten features. By reviewing the features ranking in the machine learning model output evaluation, the computing system can determine that the sample shift, between the training datasets and the testing datasets, is less than the threshold distribution shift because there are a smaller number of uninformative features ranking higher than the defined number of uninformative features. The computing system may send the message indicating that the shift in distribution satisfies the threshold distribution shift. For example, the computing system may send the message revealing that the machine learning model performance is not degraded because the dataset shift is lower than the threshold distribution shift. By doing so, the computing system can monitor the performance of the machine learning model and retrain the machine learning model to prevent negative effects (e.g., loss in accuracy, precision, recall, etc.) that may occur as a result of data shift.

In some embodiments, the computing system may generate multiple explanations, each including a ranking of a set of combined real features and uninformative features, and determine which explanation to use. For example, after the first explanation associated with the first sample of the dataset and the first output of the machine learning model has been generated, the computing system may generate a second explanation indicating that less than the threshold number of uninformative features are ranked higher than the first real feature. For example, the second explanation may indicate a second ranking of the combined set of features. In the second ranking, the number of uninformative features ranked higher than the first real feature may be less than the threshold number. In contrast, the number of uninformative features ranked higher than the first real feature may be equal to or larger than the threshold number. The computing system may determine to use the second explanation because it has fewer uninformative features that are ranked higher in the ranking.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining a dataset comprising a set of real features and a set of samples, wherein each sample comprises a value for each feature in the set of real features; generating a set of uninformative features comprising one or more values for each sample in the set of samples, wherein the set of uninformative features is combined with the set of real features to form a combined set of features; training, based on the dataset and the combined set of features, a machine learning model; generating a first local explanation associated with a first sample of the dataset and a first output of the machine learning model, wherein the first local explanation indicates a first ranking of the combined set of features; determining, based on the first local explanation, that a first uninformative feature of the set of uninformative features is ranked higher than a first real feature of the set of real features, and wherein the first uninformative feature ranking higher than the first real feature indicates that the first uninformative feature is more influential on the machine learning model; and based on the first uninformative feature ranking higher than the first real feature, removing the first real feature from the first local explanation.
2. The method of any of the preceding embodiments, further comprising: generating a second local explanation using a second technique that is different from a first technique used to generate the first local explanation, wherein the second local explanation indicates a second ranking of the combined set of features; and based on the second ranking having fewer uninformative features within a threshold number of top-ranked features of the second ranking, selecting the second local explanation for explaining the first output of the machine learning model.
3. The method of any of the preceding embodiments, further comprising: based on the first uninformative feature ranking higher than the first real feature, generating a first weighting of the first real feature; based on the first uninformative feature ranking lower than a second real feature, generating a second weighting of the second real feature; and generating, based on the first weighting and the second weighting, a weighted metric for the first local explanation.

4. The method of any of the preceding embodiments, further comprising: based on the first uninformative feature ranking higher than the first real feature, removing the first real feature from the dataset.

5. The method of any of the preceding embodiments, wherein the first uninformative feature is ranked higher than a lowest-ranked real feature.

6. The method of any of the preceding embodiments, wherein the first real feature was generated using a feature transformation function, the method further comprising: based on the first uninformative feature ranking higher than the first real feature, inactivating the feature transformation function used to generate the first real feature.

7. The method of any of the preceding embodiments, wherein each value in the set of uninformative features comprises a randomly generated value.

8. The method of any of the preceding embodiments, wherein generating the set of uninformative features comprises: determining, based on a quantity of features in the set of real features, a threshold number of features; and generating a quantity of uninformative features that is less than or equal to the threshold number of features.

9. A method comprising: obtaining a machine learning model that has been trained on a dataset comprising a set of uninformative features and a set of real features, wherein the set of uninformative features is combined with the set of real features to form a combined set of features; obtaining a sample for inference, wherein the sample comprises a first set of values corresponding to the set of real features; generating, based on the sample, a modified sample, wherein the modified sample comprises the first set of values and a second set of values corresponding to the set of uninformative features; generating, based on the modified sample and the machine learning model, an indication of a ranking for one or more features in the combined set of features; and based on the ranking for the one or more features in the combined set of features, sending a message associated with the machine learning model.

10. The method of any of the preceding embodiments, wherein a second ranking indicates that less than a threshold number of uninformative features are ranked higher than a first real feature, wherein the second ranking corresponds to a training sample of the dataset.

11. The method of any of the preceding embodiments, wherein sending a message associated with the machine learning model comprises: determining a first variation associated with the dataset; determining a second variation based on a batch of samples comprising the modified sample; and based on the second variation being different from the first variation, sending the message.

12. The method of any of the preceding embodiments, wherein sending a message associated with the machine learning model comprises: determining, based on the ranking, that more than a threshold number of uninformative features of the set of uninformative features are ranked higher than a first real feature of the set of real features; and based on more than the threshold number of uninformative features of the set of uninformative features being ranked higher than the first real feature of the set of real features, sending a message associated with the machine learning model.

13. The method of any of the preceding embodiments, wherein sending the message comprises: based on the ranking for the one or more features in the combined set of features, determining that an uncertainty level associated with the machine learning model satisfies a threshold uncertainty level; and sending a message indicating that the uncertainty level satisfies the threshold uncertainty level.

14. The method of any of the preceding embodiments, wherein sending the message comprises: based on the ranking for the one or more features in the combined set of features, determining that a shift in distribution of samples satisfies a threshold distribution shift; and sending a message indicating that the shift in distribution satisfies the threshold distribution shift.

15. The method of any of the preceding embodiments, wherein sending a message associated with the machine learning model comprises: based on a first uninformative feature ranking higher than the first real feature, generating a first weighting of the first real feature; based on the first uninformative feature ranking lower than a second real feature, generating a second weighting of the second real feature; and based on the first weighting and the second weighting, sending the message.

16. The method of any of the preceding embodiments, wherein sending a message associated with the machine learning model comprises: obtaining a set of samples comprising the sample for inference; determining, based on a set of explanations associated with the set of samples, that each sample in the set of samples has more than a threshold number of uninformative features ranked higher than a subset of the set of real features; and based on each sample in the set of samples having more than a threshold number of uninformative features ranked higher than the subset of the set of real features, sending the message.

17. The method of any of the preceding embodiments, further comprising: receiving a second request for a communication associated with a third user of a third user device; receiving, from the third user device, a communication, wherein the indication comprises a third code; and based on determining that the third code has expired, rejecting the second request.

18. A tangible, non-transitory, machine-readable medium storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for facilitating detection of uncertainty in machine learning model output through use of uninformative features, the system comprising:

one or more processors and one or more non-transitory media storing instructions that, when executed by the one or more processors, cause operations comprising:

accessing, via a network, a machine learning model, deployed in a production computing environment, that has been trained on a dataset comprising a set of uninformative features and a set of real features, wherein the set of uninformative features is generated such that the uninformative features are not correlated with correct labels of samples in the dataset, wherein the set of uninformative features is combined with the set of real features to form a combined set of features;

inputting, into the machine learning model, a modified sample that is derived from a sample for inference, wherein the sample comprises a first set of values corresponding to the set of real features and does not comprise a second set of values that corresponds to the set of uninformative features, wherein the modified sample comprises the first set of values and the second set of values; and in connection with monitoring of the machine learning model deployed in the production computing environment, sending an electronic message, associated with the machine learning model, based on (i) a first local explanation indicating a ranking for each feature in the combined set of features and derived from the inputting of the modified sample into the machine learning model and (ii) more than a threshold number of uninformative features of the set of uninformative features being ranked higher than a first real feature of the set of real features, wherein the electronic message indicates an uncertainty level of the machine learning model.

2. The system of claim 1, the operations comprising sending, via a network, a modified explanation that is derived from the first local explanation and excludes the first real feature based on more than the threshold number of uninformative features being ranked higher than the first real feature.

3. The system of claim 1, wherein sending the electronic message associated with the machine learning model comprises not sending the electronic message until at least a determination that a set of explanations associated with a set of samples, comprising the sample, indicates that each sample in the set of samples comprises more than the threshold number of uninformative features that are ranked higher than a subset of the set of real features.

4. The system of claim 1, wherein sending the electronic message associated with the machine learning model comprises:

storing a first weighting of the first real feature and a second weighting of a second real feature, the first weighting being based on a first uninformative feature ranking higher than the first real feature, the second weighting being based on the first uninformative feature ranking lower than the second real feature; and sending the electronic message based on the first weighting and the second weighting.

5. A method comprising:

accessing, via a network, a machine learning model that has been trained on a dataset comprising a set of uninformative features and a set of real features, wherein the set of uninformative features is combined with the set of real features to form a combined set of features;

inputting, into the machine learning model, a modified sample derived from a sample for inference, wherein the sample comprises a first set of values corresponding to the set of real features, wherein the modified sample comprises the first set of values and a second set of values corresponding to the set of uninformative features; and based on an indication of a ranking for one or more features in the combined set of features being derived from the inputting of the modified sample into the machine learning model, sending, via a network, a message associated with the machine learning model.

6. The method of claim 5, wherein a second ranking indicates that less than a threshold number of uninformative features are ranked higher than a first real feature, wherein the second ranking corresponds to a training sample of the dataset.

7. The method of claim 5, wherein sending the message associated with the machine learning model comprises sending the message based on a second variation derived from a batch of samples, comprising the modified sample, being different from a first variation associated with the dataset.

8. The method of claim 5, wherein sending the message associated with the machine learning model comprises sending the message based on a result indicating that more than a threshold number of uninformative features of the set of uninformative features is ranked higher than a first real feature of the set of real features.

9. The method of claim 5, wherein sending the message comprises sending the message comprising a given indication, derived from the ranking, that an uncertainty level associated with the machine learning model satisfies a threshold uncertainty level.

10. The method of claim 5, wherein sending the message comprises sending the message comprising a given indication, derived from the ranking, that a shift in distribution of samples satisfies a threshold distribution shift.

11. The method of claim 5, wherein sending the message associated with the machine learning model comprises sending the message based on a first weighting of a first real feature and a second weighting of a second real feature, the first weighting being based on a first uninformative feature ranking higher than the first real feature, the second weighting being based on the first uninformative feature ranking lower than the second real feature.

12. The method of claim 5, wherein sending the message associated with the machine learning model comprises sending the message based on a set of explanations associated with a set of samples, comprising the sample, indicating that each sample in the set of samples comprises more than a threshold number of uninformative features that are ranked higher than a subset of the set of real features.

13. One or more non-transitory computer-readable media comprising instructions that, when executed by one or more processors, cause operations comprising:

accessing a machine learning model, running on a computing device, that has been trained on a dataset comprising a set of uninformative features and a set of real features, wherein the set of uninformative features are combined with the set of real features to form a combined set of features;

inputting, into the machine learning model, a modified sample, comprising a first set of values corresponding to the set of real features and a second set of values corresponding to the set of uninformative features, to obtain an indication of a ranking for one or more features in the combined set of features; and based on the ranking for the one or more features in the combined set of features, sending a message associated with the machine learning model.

14. The one or more non-transitory computer-readable media of claim 13, wherein a second ranking indicates that less than a threshold number of uninformative features are ranked higher than a first real feature, wherein the second ranking corresponds to a training sample of the dataset.

15. The one or more non-transitory computer-readable media of claim 13, wherein sending the message associated with the machine learning model comprises sending the message based on a second variation derived from a batch of samples, comprising the modified sample, being different from a first variation associated with the dataset.

16. The one or more non-transitory computer-readable media of claim 13, wherein sending the message associated with the machine learning model comprises sending the message based on a result indicating that more than a threshold number of uninformative features of the set of uninformative features is ranked higher than a first real feature of the set of real features.

17. The one or more non-transitory computer-readable media of claim 13, wherein sending the message comprises sending the message comprising a given indication, derived from the ranking, that an uncertainty level associated with the machine learning model satisfies a threshold uncertainty level.

18. The one or more non-transitory computer-readable media of claim 13, wherein sending the message comprises sending the message comprising a given indication, derived from the ranking, that a shift in distribution of samples satisfies a threshold distribution shift.

19. The one or more non-transitory computer-readable media of claim 13, wherein sending the message associated with the machine learning model comprises sending the message based on a first weighting of a first real feature and a second weighting of a second real feature, the first weighting being based on a first uninformative feature ranking higher than the first real feature, the second weighting being based on the first uninformative feature ranking lower than the second real feature.

20. The one or more non-transitory computer-readable media of claim 13, wherein sending the message associated with the machine learning model comprises sending the message based on a set of explanations associated with a set of samples indicating that each sample in the set of samples comprises more than a threshold number of uninformative features that are ranked higher than a subset of the set of real features.

* * * * *